United States Patent
Lee et al.

(10) Patent No.: US 7,095,387 B2
(45) Date of Patent: Aug. 22, 2006

(54) DISPLAY EXPANSION METHOD AND APPARATUS

(75) Inventors: Kevin Lee, San Jose, CA (US); Shawn R. Gettemy, San Jose, CA (US); Sherridythe A. Fraser, San Jose, CA (US); William R. Hanson, Mountain View, CA (US); Yoon Kean Wong, Redwood City, CA (US); Mark W. Oliver, Fox River Grove, IL (US)

(73) Assignee: Palm, Inc., San Jose, CA (US)

( * ) Notice: Subject to any disclaimer, the term of this patent is extended or adjusted under 35 U.S.C. 154(b) by 511 days.

(21) Appl. No.: 10/085,911

(22) Filed: Feb. 28, 2002

(65) Prior Publication Data

US 2003/0160735 A1   Aug. 28, 2003

(51) Int. Cl.
    G09G 5/14   (2006.01)
(52) U.S. Cl. .............................. 345/4; 345/1.3; 349/58
(58) Field of Classification Search ............... 345/1.1, 345/3.2, 3.3, 4, 1.3, 467; 349/58, 60; 715/761, 715/771, 788; 455/575.3; 710/104; 713/100; 709/247

See application file for complete search history.

(56) References Cited

U.S. PATENT DOCUMENTS

| | | | | |
|---|---|---|---|---|
| 4,171,585 A * | 10/1979 | Macuka | ........................ | 40/518 |
| 5,351,843 A * | 10/1994 | Wichman et al. | ........... | 211/195 |
| 5,477,631 A * | 12/1995 | Hewitt | ........................ | 40/605 |
| 5,510,809 A * | 4/1996 | Sakai et al. | .............. | 345/440.2 |
| 5,768,163 A | 6/1998 | Smith, II | | |
| 5,826,397 A * | 10/1998 | Armold | ........................ | 52/646 |
| 5,850,209 A | 12/1998 | Lemke et al. | | |
| 5,983,073 A | 11/1999 | Ditzik | | |
| 6,014,379 A * | 1/2000 | White et al. | ................. | 370/389 |
| 6,047,196 A * | 4/2000 | Makela et al. | ........... | 455/556.1 |
| 6,052,120 A | 4/2000 | Nahi et al. | | |
| 6,084,584 A | 7/2000 | Nahi et al. | | |
| 6,185,589 B1 * | 2/2001 | Votipka | ....................... | 715/517 |
| 6,262,785 B1 * | 7/2001 | Kim | ............................ | 349/58 |
| 6,313,877 B1 * | 11/2001 | Anderson | .............. | 348/333.05 |
| 6,427,857 B1 * | 8/2002 | Adams et al. | .............. | 211/189 |
| 6,567,102 B1 * | 5/2003 | Kung | ........................ | 345/660 |
| 6,570,583 B1 * | 5/2003 | Kung et al. | ................. | 345/661 |

OTHER PUBLICATIONS

Pfeiffer, Andreas, *The Future of Electronic Paper*, ZDNet News, dated May 11, 2001, pp. 1-3, printed from the Internet site: http://www.zdnet.com/zdnn/stories/comment/0,5859,2717 791,00 . . . on Oct. 3, 2001.

(Continued)

*Primary Examiner*—Richard Hjerpe
*Assistant Examiner*—Abbas Abdulselam
(74) *Attorney, Agent, or Firm*—Foley & Lardner LLP

(57) ABSTRACT

A portable electronic device is disclosed. The portable electronic device includes a housing. The portable electronic device also includes computing electronics that are supported by the housing. The computing electronics include a processor, a display controller coupled to the processor, and memory coupled to the processor. The portable electronic device disclosed also includes an expandable display coupled with a display controller. The expandable display is expandable from a first size to a second size. The first size is different than the second size. A sensor is coupled to the processor. The sensor is configured to provide a signal representative of the size of the display.

29 Claims, 4 Drawing Sheets

OTHER PUBLICATIONS

*Turning a New Page—Books Go Electronic*, p. 1, printed from the Internet site: http://www.eink.com/solutions/publishing.htm on Oct. 3, 2001.

*E-Paper Moves a Step Nearer*, BBC News, dated Apr. 23, 2001, pp. 1-3, printed from the Internet site: http://news.bbc.co.uk/hi/english/sci/tech/newsid_1292000/129285 . . . on Oct. 3, 2001.

*Electronic Reusable Paper*, pp. 1-3, printed from the Internet site: http://www.parc.xerox.com/dhl/projects/gyricon and http://www.parc.xerox.com/dhl/projects/gyricon/images/thing-ep.jpg on Oct. 3, 2001.

Mann, Charles, *Electronic Paper Turns the Page*, Technology Review, dated Mar. 2001, pp. 1-10, printed from the Internet site: http://www.technologyreview.com/magazine/mar01/mann.asp on Oct. 3, 2001.

Jacobson, Dr. Joseph M., et al., *Electronic Paper: Electronic Paper Books and Electronic Books*, pp. 1-2, printed from the Internet site: http://www.media.mit.edu/micromedia/elecpaper.html on Oct. 3, 2001.

*Panasonic Unveils PC with Wireless Display*, Itworld.com, dated Jun. 26, 2001, pp. 1-3, printed from the Internet site: http/www.itworld.com/Comp/1290/IDG010626panasonic/ on Oct. 3, 2001.

*Panasonic Introduces Ruggedized Handheld with Integrated Keyboard and Touchscreen Surface*, dated Sep. 24, 2001, pp. 1-4, printed from the Internet site: http://www.panasonic.com/ciomputer/notebook/html/05_apdrc.asp? . . . on Oct. 3, 2001.

\* cited by examiner

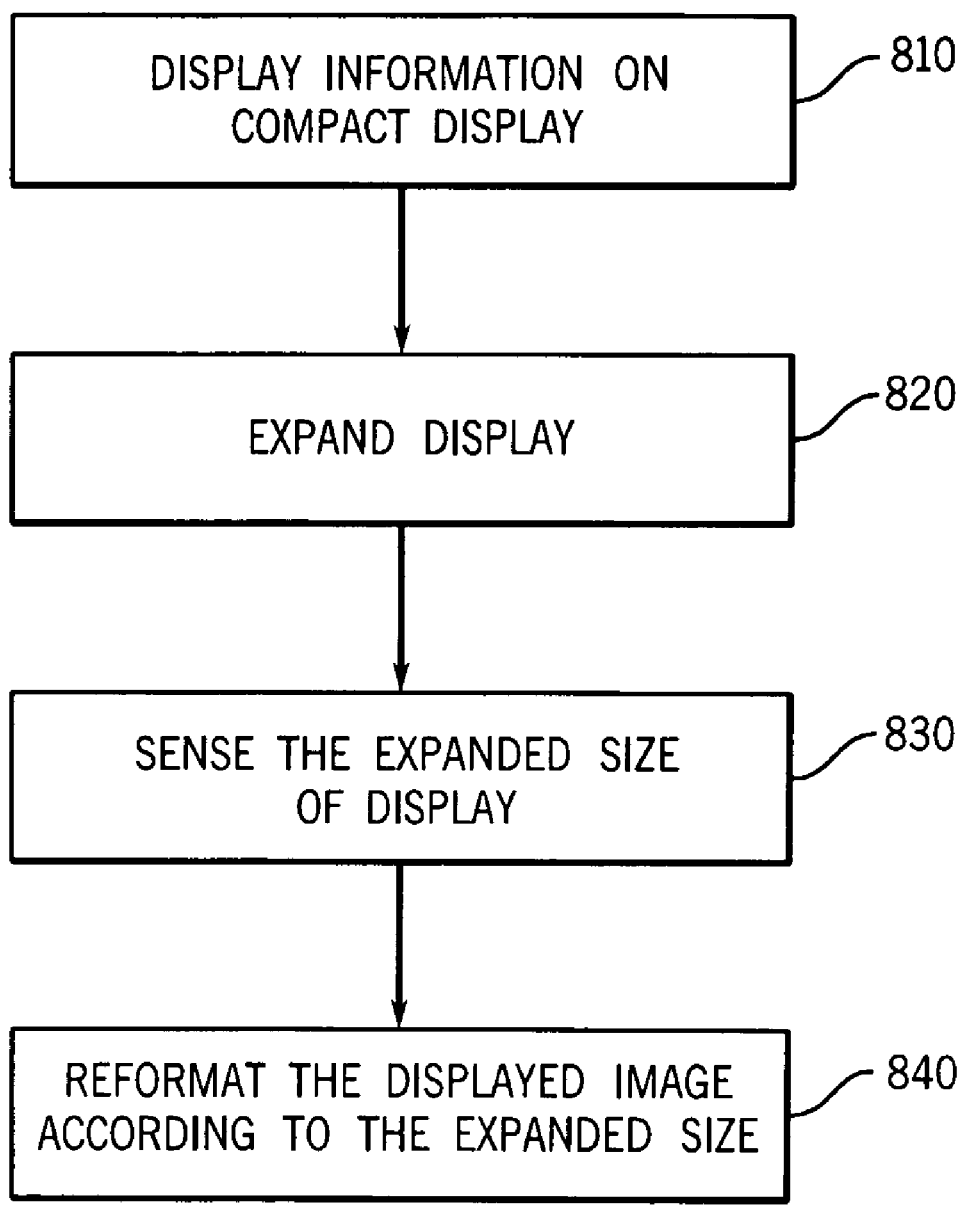

DISPLAY EXPANSION METHOD AND APPARATUS

REFERENCE TO RELATED PATENT APPLICATIONS

The present application is related to U.S. patent application Ser. No. 10085945, entitled DETACHABLE EXPANDABLE FLEXIBLE DISPLAY, assigned to the same assignee as the present application and which is herein incorporated by reference.

BACKGROUND

The present invention relates generally to the field of handheld computing devices. More particularly, the disclosure relates to an expandable display for a handheld computing device. More particularly still, the disclosure relates to a display that automatically formats information displayed based on the current expansion state and/or the current size of the display surface exposed to a user.

Handheld computing devices usually display data stored in memory or generated by a processor on a visual display that is slightly smaller than the size of the handheld computing device. The size of the handheld computing device is generally compact and correspondingly the visual display is significantly smaller than the size of a standard computer monitor. The amount of information that is typically displayed by conventional handheld computers is limited to a relatively small display screen size. Further, the small size of the screen has prompted some handheld computing devices to focus on displaying abbreviated or simplistic content.

Accordingly, there is a need for a display screen that can display data from a handheld computer on a larger screen. There is also a need for a handheld computing device having an expandable display. Further, there is a need for methods of using a handheld computer to display greater amounts of user information compared with conventional portable electronic device displays. Further still, there is a need for an expandable display for a portable electronic device that is able to reformat information based upon the size of the display surface exposed to the user. Yet further still, there is a need for a handheld computer that can automatically determine the size of an expandable display.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to a portable electronic device. The portable electronic device includes a housing. The portable electronic device also includes computing electronics supported by the housing. The computing electronics include a processor, a display controller coupled to the processor, and memory coupled to the processor. Further, the portable electronic device includes an expandable display coupled to the display controller. The expandable display is expandable from a first size to a second size. The first size is different than the second size. Further still, the portable electronic device includes a sensor coupled to the processor. The sensor is configured to provide a signal representative of the size of the display.

Another exemplary embodiment relates to a method of providing information to a user of an electronic device. The method includes providing a first amount of user information on a display in a first size configuration. The method also includes resizing the display to a second size configuration. Further, the method includes sensing, automatically, the second size configuration of the display. Further still, the method includes reformatting the displayed image according to a second size configuration.

Yet another exemplary embodiment relates to a display for an electronic device. The display includes a first display surface. The first display surface is visible in a first configuration. The display also includes a second display surface. The second display surface is larger than the first display surface. The second display surface is visible in a second configuration. Further still, the display includes a sensor configured to provide a configuration signal representative of the display being in one of the first configuration and the second configuration.

Still yet another exemplary embodiment relates to a portable electronic device configured to provide information to a user of the portable electronic device. The portable electronic device includes a means for providing a first amount of user information on a display in a first size configuration. The portable electronic device also includes a means for resizing the display to a second size configuration. The portable electronic device further includes a means for sensing, automatically, the second size configuration of the display. Further still, the portable electronic device includes a means for reformatting the displayed image according to the second size configuration.

Alternative exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 6 is a flow diagram illustrating an exemplary embodiment of a process of displaying data using an expandable visual display system in accordance with an exemplary embodiment.

DETAILED DESCRIPTION OF PREFERRED AND EXEMPLARY EMBODIMENTS

A system and method for providing an expandable, flexible display for a handheld computing device that is capable of sensing the size of the visible display surface or display area and reformatting information thereon, based on the size of the visible display area, is described. In the following description, for purposes of explanation, numerous specific details are set forth to provide a thorough understanding of exemplary embodiments of the invention. It will be evident, however, to one skilled in the art that the invention may be practiced without these specific details. In other instances, structures and devices are shown in block diagram form or generalized illustration form to facilitate description of the exemplary embodiments.

Figure 1:
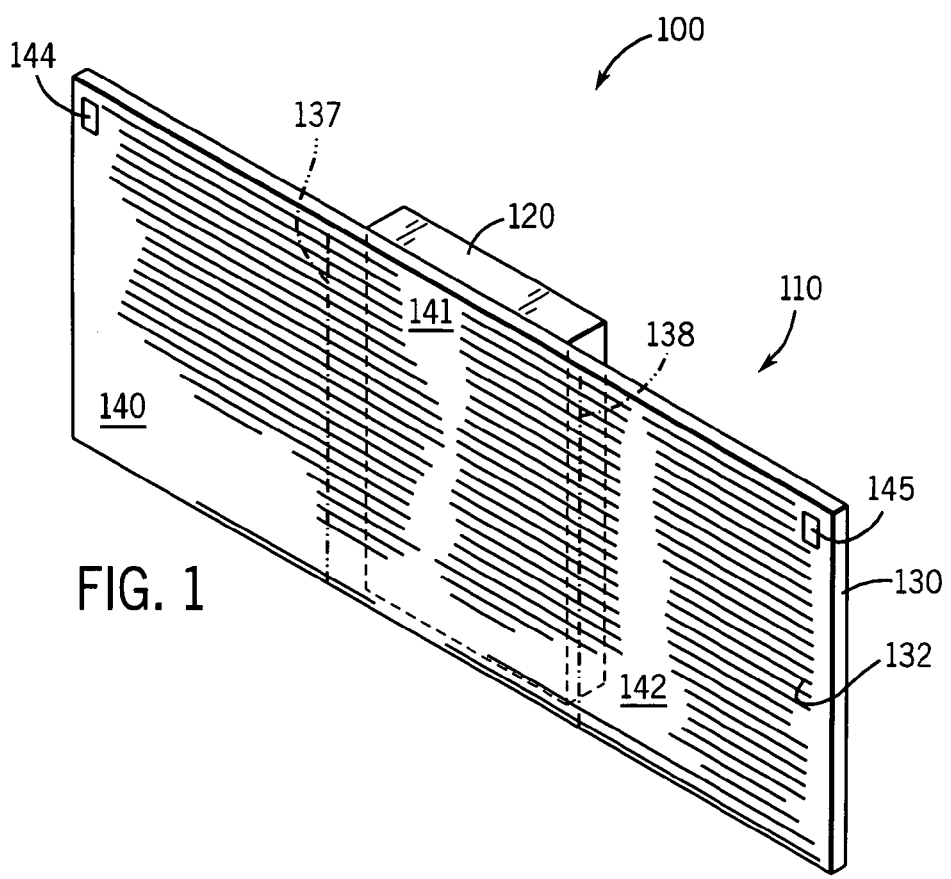
FIG. 1 is a generalized perspective view of a handheld computing device including a processing unit and a visual display unit, the visual display unit exposing an enlarged display surface, in accordance with an exemplary embodiment.

FIG. 1 is a generalized perspective view 100 of a handheld computing device 110 including a processing unit 120 and a visual display unit 130 in accordance with an exemplary embodiment. Visual display unit 130 may be a fixed or a detachable visual display shown attached to processing unit 120.

Processing unit 120 may be a handheld computer, similar to Palm™ handheld computers available from Palm, Inc. of Santa Clara, Calif., a handheld personal digital assistant, a wireless cellular digital phone, a pager, or any other such portable electronic device. Visual display unit 130 may be any visual display capable of displaying data transmitted from processing unit 120. Visual display unit 130 may include an enlarged or expanded visual display area 132.

Display area 132 may be an LCD screen, e-paper (such as eInk, Smart Paper™ by Gyricon Media, APD™ by Citala, etc.), or other bi-stable displays, or any other type of applicable visual display. Display area 132 may further include shutter technology to make the display, or portions thereof, selectively transparent. Visual display unit 130 is shown in FIG. 1 in a fully expanded state.

According to an exemplary embodiment, visual display unit 130 may include folding lines 137 and 138. These fold lines are shown for illustrative purposes only, the display may be a solid unit or a unit that can be folded according to various configurations, structure and technique. According to an exemplary embodiment, folding lines 137 and 138 are configured to allow the visual display to be folded to a compact state roughly equivalent to the size of processing unit 120. Folding lines 137 and 138 allow display unit 130 to be folded into distinct sections or display surfaces 140, 141, and 142. In the embodiment depicted in FIG. 1, enlarged or expanded display surface or area 132 is thereby formed of display surfaces 140, 141, and 142. Further, according to an exemplary embodiment, folding lines 137 and 138 are representative of structures which allow display 130 to be compacted including, but not limited to, hinges, score lines, flexible electrical connectors, fabrics, polymeric hinges or flexible materials, living hinges, and/or connectors allowing disconnection and detachment of sections 140 and 142, etc.

Figure 2:
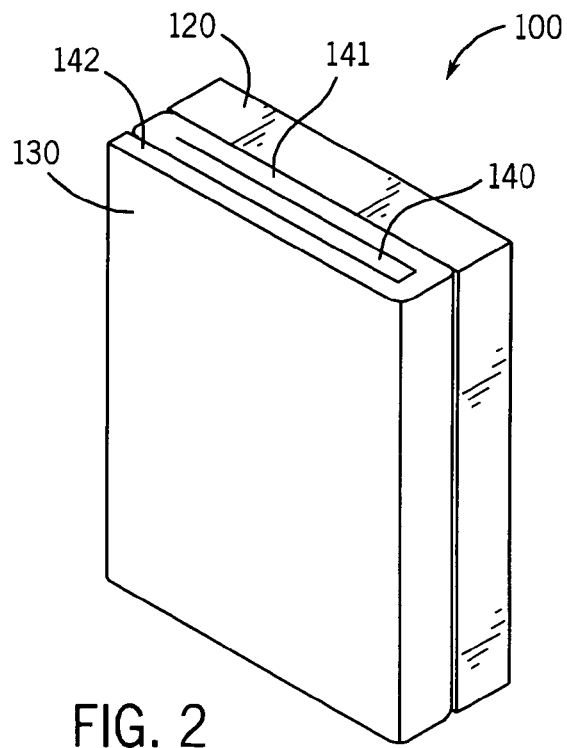
FIG. 2 is a generalized perspective view of the handheld computing device of FIG. 1, with the visual display unit exposing a compacted display surface, in accordance with an exemplary embodiment.

According to an exemplary embodiment, as depicted in FIG. 2, visual display unit 130 can be implemented using shutter technology. Shutter technology allows the user to force sections 140 and 142 of display area 132 to be transparent while visual display unit 130 is in a compact state, as shown. This has the advantage of allowing the user to view data when visual display unit 130 is in a compact state and layers 140 and 142 of the display are folded over display surface 141 to form a compact display area.

In the exemplary embodiment depicted in FIG. 2, sections 140 and 142 are folded over sections 141—sections 140 and 142 are made transparent and user information is displayed on section 141 which may be viewed through sections 140 and 142. In the case of a rigid display, such as an LCD display, the layers may be hinged. In the case of a flexible display, such as e-paper, the layers may be folded, flexed, or rolled. Additionally, shutter technology may be used to make the background of a display image transparent. The data may be displayed in an opaque or semi-opaque form on the transparent display. Displaying data on a transparent display also allows visual display unit 130 to be used as a transparency in conjunction with an overhead projector or other type of projector to project displayed images on a large screen.

According to another exemplary embodiment, visual display unit 130 may be implemented using a bi-stable visual display. A bi-stable visual display would allow the user to detach visual display unit 130 from a power source, either within processing unit 120 or visual display 130, and continue to view the displayed user information in a static manner.

According to an exemplary embodiment, visual display unit 130 can be utilized in a compact or a folded state (FIG. 2). The user of handheld computing device 110 may view user information displayed on display area 141 in the compact state. The compact state may be advantageous for viewing display area 141 while travelling or for quick access to information. According to an exemplary embodiment, the compact state may approximate the size of processing unit 120 to facilitate storage and transport of handheld computing device 110. Visual display unit 130 configured in a compact state offers all of the, advantages of the conventional handheld computing device display in that it is compact and easily portable.

According to an exemplary embodiment, a user of the handheld computing device may also view user information on the handheld computing device display with the display configured in an expanded state (FIG. 1). The expanded state may be advantageous while viewing a large document or a large image. Expansion of visual display unit 130 may allow display of information in a manner similar to a standard computer monitor, and offer many of the advantages thereof.

Visual display unit 130 also includes at least one sensor used for sensing the display configuration and/or size configuration of display 130. For example, as depicted in FIG. 1, display unit 130 includes two sensors 144 and 145. Sensors 144 and 145 may be located in any convenient location on or adjacent display 130. Displays 144 and 145 may be, in an exemplary embodiment, magnetic sensors, electrical connection sensors, optical sensors, electrotextile touch sensors, hinge sensors, electromagnetic sensors, and the like. Further, sensors 144 and 145 may be incorporated into a touch sensor (or digitizer) which overlays or underlays panels 140, 141, and 142 and in which folding lines 137 and 138 may be sensed automatically.

Sensors 144 and 145 communicate with processing unit 120, a signal representative of the size configuration of display unit 130. In an exemplary embodiment, the signal or signals are communicated to a processor and/or to a display controller which dictates how user information being displayed on display 130 is to be formatted and displayed. For example, information may be displayed on display panel 141 in the compact state as depicted in FIG. 2. Upon opening or expanding display unit 130, sensors 144 and 145 automatically transmit information to processing unit 120 which tells processing unit 120 that display unit 130 is in an expanded state having an expanded display surface exposed to a user. Accordingly, information which was displayed on display panel 141 alone in the compact state, may now be enlarged to fill panels 140, 141, and 142 by changing the resolution of the overall display. Alternatively, when display unit 130 is expanded, the information being displayed on display surface 132 may be reformatted to include more information than was being displayed in the compact state of FIG. 2. Accordingly, the resolution of the display in the expanded state may be kept constant while the amount of information to be displayed on display surface 132 is increased in order to fill all of sections 140, 141, and 142.

Conversely, with display 130 in the expanded state of FIG. 1, a user may be able to view a large amount of information because of the expanded display surface 132. As the display unit 130 is compacted, sensors 144 and 145 send signals to processing unit 120 representative of such action. Accordingly, the information that was being displayed on expanded display surface 132 may then be reformatted, by truncating such information, such that the resolution of the display stays the same and less information is displayed at one time on compacted display unit 130 depicted in FIG. 2. However, if a user has specified that the resolution is to change when the display size is changed, the large amount of information that was displayed on expanded display surface 132 of FIG. 1 may still be displayed on panel 141 of display unit 130 in the compacted state depicted in FIG. 2 by having the display resolution changed automatically when the display unit is compacted.

Figure 3:
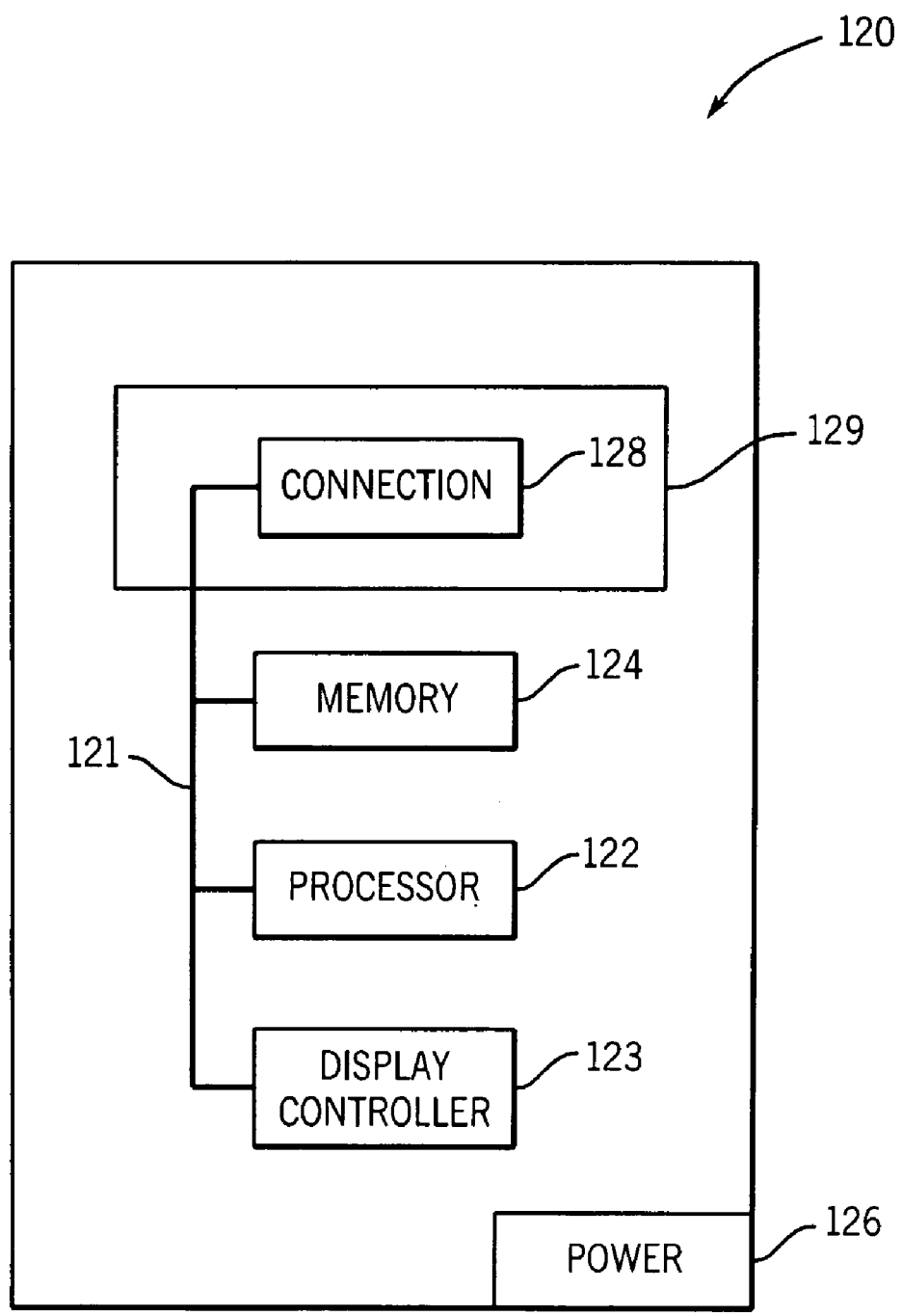
FIG. 3 is a general block diagram of the processing unit for a handheld computing device in accordance with an exemplary embodiment.

FIG. 3 is a generalized block diagram illustrating the components of processing unit 120. According to an exemplary embodiment, processing unit 120 may include a processing unit processor 122, a display controller 123, a processing unit memory 124, a processing unit power source 126, and a processing unit connection port 128 enclosed in a processing unit connection housing 129. Processor 122, display controller 123, memory 124, and connection 128 may all be in communication via a communications bus 121. Processing unit processor 122 can be any microprocessor capable of accessing information stored in processing unit memory 124, performing actions using information from any source, and alternatively storing information in processing unit memory 124 or transmitting information to visual display unit 130.

Processing unit memory 124 may be any form of data storage. It may be at least one of random access memory (RAM) and/or read only memory (ROM). Information may be stored permanently until overwritten and/or stored temporarily for use while the unit is active.

Processing unit power source 126 may be a battery or fuel cell, a direct line from a wall outlet, current from a solar cell or any other power source sufficient to satisfy the power requirement for processing unit 120.

Figure 4:
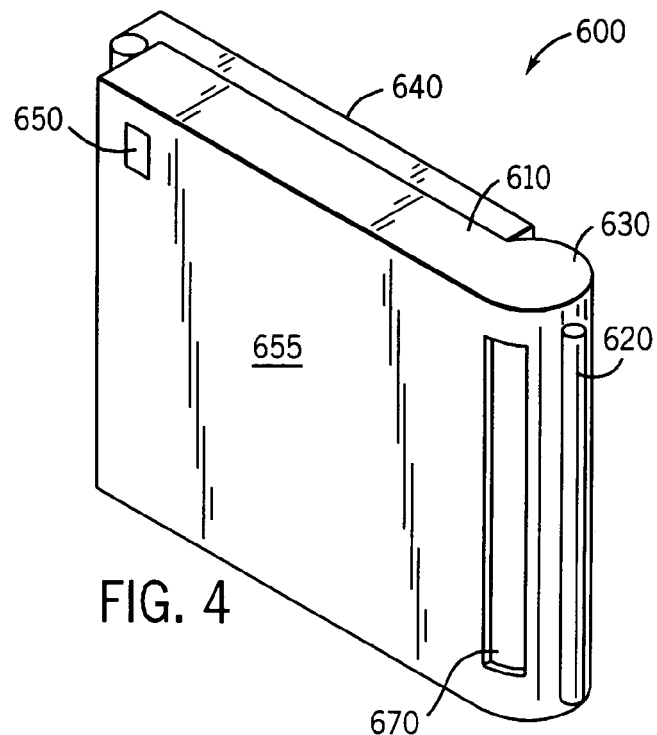
FIG. 4 is a generalized perspective view of a handheld computing device including a processing unit and a visual display unit showing an alternative method of mounting the visual display unit to the processing unit in accordance with an exemplary embodiment.

FIG. 4 is a partial generalized perspective view of an alternative handheld computing device 600 according to an exemplary embodiment. Handheld computing device 600 may include a processing unit 610, a rolled visual display unit 620, a retracting apparatus 630, and a visual display support 640. Processing unit 610 may be a processing unit similar to processing unit 120 described with reference to FIG. 3. Rolled visual display unit 620 may be a visual display similar to visual display unit 130, described with reference to FIG. 1, that can be retracted and rolled using retracting apparatus 630. Visual display unit 620 may be implemented using e-paper or any other type of display that is sufficiently flexible such that it can be rolled and stored.

Figure 5:
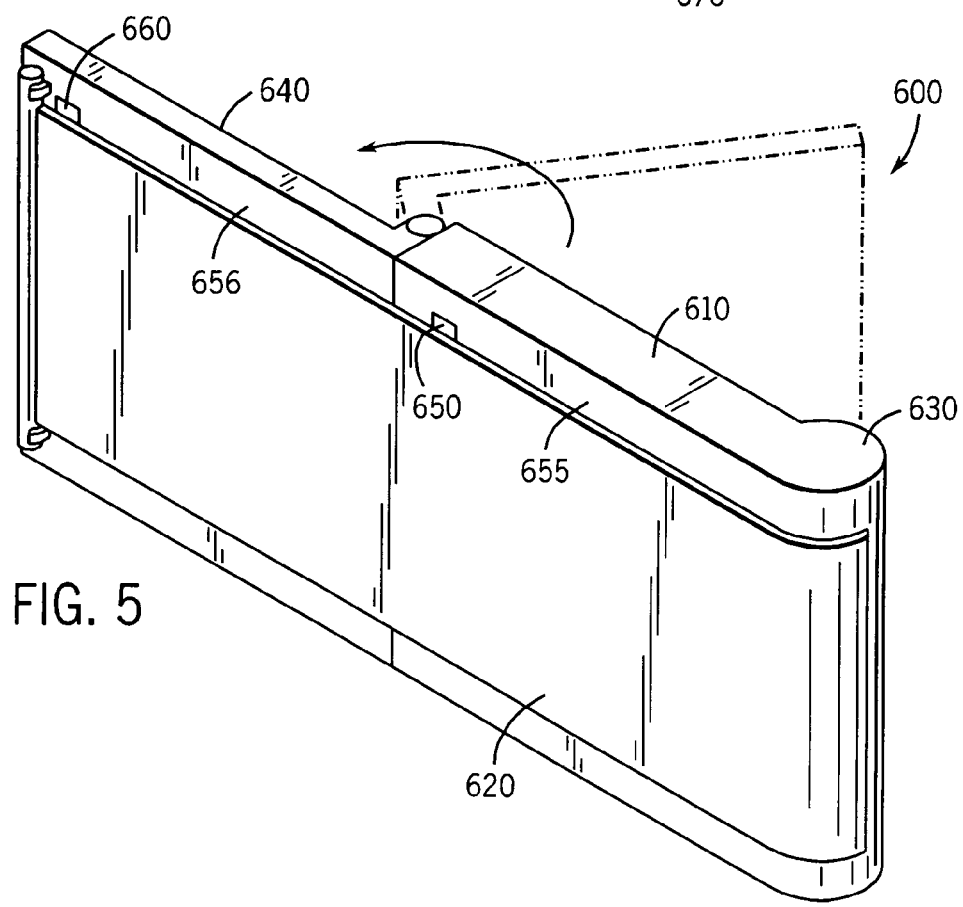
FIG. 5 is a generalized perspective view of a handheld computing device of FIG. 4 showing the visual display in the expanded state in accordance with an exemplary embodiment.

In an exemplary embodiment, handheld computing device 600 may also include sensors 650 and 660 which are configured to sense the size of display 620. In an exemplary embodiment, sensor 650 may be used to sense if display 620 is in a first expanded state in which the display substantially covers surface 655, or whether display 620 is completely retracted as depicted in FIG. 4. Further, sensors 650 and 660 may be used to sense when display 620 is in an expanded display configuration as depicted in FIG. 5. Further, in an alternative embodiment, a sensor may be located in retracting apparatus 630 which would sense the size of display 620 that is exposed such that the size of display 620 may be any size up to a maximum size. As described with respect to FIGS. 1 and 2, the information displayed on display 620 is reformatted and/or changed based on the size of the exposed display 620. In one configuration, a user may select to change the amount of information displayed when the size of display 620 is changed, the user may decide to change the resolution of display 620 when the size of display 620 is changed, or the user may decide to change both the amount of information displayed and the resolution of display 620.

Retracting apparatus 630 can be any mechanism that can retract and store a flexible display. According to an exemplary embodiment, retracting apparatus 630 may include a spring and roller inside a casing to facilitate retracting and storing visual display 620. FIG. 4 shows visual display 620 in a fully retracted state. The visual display is completely stored within retracting apparatus 630.

FIG. 5 depicts handheld computing device 600 in an expanded state. In the fully expanded state, visual display support 640 is elongated and locked into place to support and anchor visual display 620 in the expanded state. In the expanded state, visual display 620 is pulled from retracting mechanism 630 and attached to visual display support 640.

According to an exemplary embodiment, visual display 620 may be retracted and stored when not in use. Storage of the visual display has the advantage of reducing the size of handheld computing device 600 for convenient transport. According to an exemplary embodiment, storage of visual display 620 may have the additional advantage of protecting the display screen within a retracting apparatus casing. In an exemplary embodiment, a display window 670 may be formed in the retracting apparatus casing. Display window 670 may be used to view a small amount of data while visual display 620 is in the retracted state. For example, a user may view information such as, but not limited to, time and date, current alarms, battery status and/or battery charge, etc.

According to an exemplary embodiment, visual display 620 may be pulled out and attached to visual display support 640 during use. Expansion has the advantage of providing a visual display that is larger than the size of processing unit 610. Visual display support 640 may also be constructed to present a solid surface to support a display screen using touch screen technology. The support may allow the user to more easily use a stylus to input information.

FIG. 6 is a flow diagram 800 illustrating an exemplary embodiment of a method for displaying data using expandable visual display system 130, or like display system, according to an exemplary embodiment. During use, user information may be displayed on a compact display (action 810) such as the display depicted in FIG. 2. A user may then decide to expand the display (action 820), such as to an expanded configuration as depicted in FIG. 1. Sensors on the portable electronic device may then sense the expanded size of the display (action 830). The displayed information is then reformatted according to the expanded size of the display (action 840).

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A portable electronic device, comprising:
   a housing;
   computing electronics supported by the housing, including a processor, a display controller coupled to the processor and memory coupled to the processor;
   an expandable display coupled to the display controller, the expandable display is expandable from a first size to a second size, the first size being different than the second size, the display being viewable by a user in both the first size and second size configurations; and
   a sensor coupled to the processor, the sensor configured to provide a signal representative of the size of the display.

2. The portable electronic device of claim 1, wherein the computing electronics run a program to interpret the signal and to reformat information on the display to fill the display screen.

3. The portable electronic device of claim 2, wherein the reformat includes displaying more information on the display.

4. The portable electronic device of claim 2, wherein the reformat includes displaying less information on the display.

5. The portable electronic device of claim 2, wherein the reformat includes displaying the same amount of information at a different resolution.

6. The portable electronic device of claim 1, wherein the expandable display includes a foldable display.

7. The portable electronic device of claim 1, wherein the expandable display includes a rollable display.

8. The portable electronic device of claim 7, wherein the housing includes an aperture wherein a user may view information through the aperture on a portion of the rollable display within the housing.

9. The portable electronic device of claim 1, wherein the sensor includes a hinge sensor.

10. The portable electronic device of claim 1, wherein the sensor includes an electrotextile sensor.

11. The portable electronic device of claim 1, wherein the sensor includes a magnetic sensor.

12. The portable electronic device of claim 1, wherein the sensor includes an electrical sensor.

13. The portable electronic device of claim 1, wherein the sensor includes an optical sensor.

14. A method of providing information to a user of an electronic device, comprising:
   providing a first amount of user information on a display in a first size configuration;
   physically resizing the display to a second size configuration;
   sensing, automatically, the second size configuration of the display; and
   reformatting the displayed image according to the second size configuration.

15. The method of claim 14 wherein the reformatting includes displaying a second amount of user information on the display in the second configuration.

16. The method of claim 15 wherein the second amount of user information is more than the first amount of user information.

17. The method of claim 15 wherein the first amount of user information is the same as the second amount of user information, and the second amount of user information is displayed at a different resolution.

18. A display for an electronic device, comprising:
   a first display surface, the first display surface being visible in a first configuration;
   a second display surface, the second display surface being larger than the first display surface, the second display surface being visible in a second configuration; and
   a sensor configured to provide a configuration signal representative of the display being in one of the first configuration and the second configuration when the configuration is physically changed from the first configuration to the second configuration.

19. The display of claim 18 wherein the first and second display surfaces are part of a foldable display.

20. The display of claim 18 wherein the first and second display surfaces are part of a rollable display.

21. The display of claim 18 wherein the sensor includes a hinge sensor.

22. The display of claim 18 wherein the sensor includes an electrotextile sensor.

23. The display of claim 18 wherein the sensor includes a magnetic sensor.

24. The display of claim 18 wherein the sensor includes an electrical sensor.

25. The display of claim 18 wherein the sensor includes an optical sensor.

26. A portable electronic device configured to provide information to a user of the portable electronic device, comprising:
   a means for providing a first amount of user information on a display in a first size configuration;
   a means for physically resizing the display to a second size configuration;
   a means for sensing, automatically, the second size configuration of the display; and
   a means for reformatting the displayed image according to the second size configuration.

27. The portable electronic device of claim 26 wherein the means for reformatting includes a means displaying a second amount of user information on the display in the second configuration.

28. The portable electronic device of claim 27 wherein the second amount of user information is more than the first amount of user information.

29. The portable electronic device of claim 27 wherein the first amount of user information is the same as the second amount of user information, and the second amount of user information is displayed at a different resolution.

* * * * *